US006973502B2

(12) United States Patent
Patil (10) Patent No.: US 6,973,502 B2
(45) Date of Patent: Dec. 6, 2005

(54) BEARER IDENTIFICATION TAGS AND METHOD OF USING SAME

(75) Inventor: Manoj Patil, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 827 days.

(21) Appl. No.: 09/821,188

(22) Filed: Mar. 29, 2001

(65) Prior Publication Data

US 2002/0143897 A1  Oct. 3, 2002

(51) Int. Cl.⁷ .................. G06F 15/16; G06F 15/173; H04Q 7/26; H04Q 7/00; H04B 7/204
(52) U.S. Cl. .................. 709/232; 709/226; 709/223; 709/238; 455/414.1; 455/446; 370/332; 370/325
(58) Field of Search .................. 709/228, 227, 709/218, 226, 229, 232, 223, 238; 455/414.1, 455/466, 412, 552, 553, 517; 370/332, 325

(56) References Cited

U.S. PATENT DOCUMENTS

| | | | | |
|---|---|---|---|---|
| 5,473,679 A | * | 12/1995 | La Porta et al. ......... | 379/201.05 |
| 5,719,918 A | * | 2/1998 | Serbetciouglu et al. ..... | 380/271 |
| 5,742,845 A | | 4/1998 | Wagner | |
| 5,898,838 A | | 4/1999 | Wagner | |
| 6,081,534 A | * | 6/2000 | Sipila .................. | 370/466 |
| 6,167,429 A | * | 12/2000 | Mercer et al. .............. | 709/203 |
| 6,560,777 B2 | * | 5/2003 | Blackketter et al. ........ | 725/110 |
| 6,584,321 B1 | * | 6/2003 | Coan et al. ................ | 455/466 |
| 6,597,377 B1 | * | 7/2003 | MacPhail ................... | 715/738 |
| 6,608,832 B2 | * | 8/2003 | Forslow ..................... | 370/353 |
| 6,647,265 B1 | * | 11/2003 | Olofsson et al. ............ | 455/445 |
| 6,668,175 B1 | * | 12/2003 | Almgren et al. ............ | 455/522 |
| 6,674,733 B1 | * | 1/2004 | Huusko ...................... | 370/329 |
| 6,748,211 B1 | * | 6/2004 | Isaac et al. ............... | 455/414.1 |
| 6,810,414 B1 | * | 10/2004 | Brittain ..................... | 709/219 |
| 6,826,406 B1 | * | 11/2004 | Vialen et al. ............... | 455/450 |
| 2002/0039892 A1 | | 4/2002 | Lindell | |
| 2003/0012217 A1 | * | 1/2003 | Andersson et al. ......... | 370/437 |

FOREIGN PATENT DOCUMENTS

| | | |
|---|---|---|
| WO | WO 97/23115 | 6/1997 |
| WO | WO 99/01991 | 1/1999 |
| WO | WO 99/66736 | 12/1999 |
| WO | WO 00/16580 | 3/2000 |
| WO | WO 00/28760 | 5/2000 |

OTHER PUBLICATIONS

Provisional U.S. Appl. No. 60/238,072, filed Oct. 2000, Lindell.*
International Preliminary Examination Report; Dec. 13, 2002; IPEA/US.

* cited by examiner

Primary Examiner—Bharat Barot
Assistant Examiner—Asad Nawaz
(74) Attorney, Agent, or Firm—Steven A. Shaw; Alston & Bird LLP (57) ABSTRACT

A novel system for the optimum selection of bearer service is provided. A tag identifies a bearer service with which data may be best transmitted. The special service is described in the tag elements.

8 Claims, 8 Drawing Sheets

- 210 WAE API
- 215 PLATFORM APIs
- 220 WDP API (Bearers)

230 USER AGENT LAYER
- 231 WML BROWSER
- 232 WML SCRIPT VIRTUAL MACHINE
- 233 WML SCRIPT LIBRARIES

240 URL & HTTP LAYER
- 241 URL LOADER
- 242 WSP HEADER HANDLING
- 243 CACHE
- 245 HTTP LOADER / WSP ADAPTER

250 PROTOCOL LAYER
- 260 WIRELESS PROTOCOL STACK
  - 261 WSP
  - 262 WTP
  - 263 WTLS
  - 264 WDP

BEARER IDENTIFICATION TAGS AND METHOD OF USING SAME

FIELD OF THE INVENTION

This invention relates generally to data transfer systems and in particular to a means for identifying data so that most efficient service may be used for transfer of the data in a communication system.

BACKGROUND OF THE INVENTION

A third generation system for communications known as the Universal Mobile Telecommunications System (UMTS), is used as an example in this patent application. In cellular telecommunication systems, a single connection or data connection through the cellular telecommunication network is called a bearer. Generally, a bearer is associated with a set of parameters, Quality of Service (QoS), pertaining to data communication between a certain terminal equipment and a network element, such as a base station or internetworking unit (IWU) connecting the cellular network. The set of parameters associated with a bearer comprises typically, data transmission speed, allowed delays, allowed bit error rate (BER), the minimum and maximum values for these parameters. A bearer may further be a packet transmission bearer or a circuit switched bearer and support for example transparent or non-transparent connections. A bearer may be thought of as a data transmission path having the specified parameters connecting a certain mobile station and a certain network element for transmission of payload information. One bearer connects one mobile station to one network element. However, a bearer may pass through a number of network elements. One mobile station may in some systems support one bearer only, in some other systems also more than one simultaneous bearers.

Short message service (SMS) is an example of a bearer service. Specifically for message communication in mobile networks—specifically in GSM networks. SMS differs from speech and data services in that to send a short message, a connection from the sender to the receiver need not be established, since short messages are transmitted through signaling on control or signaling channels typically for example data transmissions in digital mobile networks.

Currently, all services are "best effort" or "best try" services. This means that the applications or users are not guaranteed any given level of quality, but the operating parameters vary according the instantaneous degree of utilization of the internet. Many applications have clearly different optimum operating parameters.

UMTS allows a user to negotiate bearer characteristics that are most appropriate for transmitting certain types of data. It is possible to change bearer properties via a bearer renegotiation procedure during an active connection. Bearer negotiation is initiated by an user/application, while renogtiation may be initiated either by the application or by the network (e.g. in handover situations).

Recent advancements in web protocols have resulted in the creation of the Wireless Application Protocol (WAP). WAP solutions using Handheld Device Markup Language (HDML) or Wireless Markup Language (WML) allow web content to be adapted for use on narrow bandwidth and limited screen size handheld devices such as mobile stations. Mobile station manufactures are embedding high-value added applications such as WAP compliant microbrowsers in their mobile stations that allow the mobile stations to function as a client for services and content from the Internet through a wireless portal. Microbrowsers may be logic in the form of software or firmware embedded in the end user device that enables the device to interact with a gateway on a network. Examples of microbrowsers are the Nokia Microbrowser as shown in Appendix A—herein incorporated by reference and UP.Browser from Phone.com (Redwood City, Calif.). A style guide for HDML may also be obtained from (Phone.com and is incorporated herein by reference.

Information on WAP can be obtained from *Understanding WAP; Wireless Applications, Devices, and Services*; ISBN 1-58053-093-1; Artech House Publishers (Boston) herein incorporated by reference.

A wireless portal or gateway is the point of entry through which the user accesses Internet content and services. The portal may send content and/or services to the user (referred to as PUSH) or the user may request content or services from the portal provider (referred to as PULL). An example of such a portal would be the Nokia Artus MAX Platform. During a Push process, negotiation allows a user to negotiate bearer characteristics that are most appropriate for transmitting certain types of data. During a Pull process, the user may request the most appropriate service with which to provide data. It is desirable to provide appropriate bearer services based on data/information being Pushed or Pulled.

SUMMARY OF THE INVENTION

A novel system to provide for an optimum selection of bearer service. A novel tag identifies data as being best transmitted via a special service as described in the tag elements.

A method in accordance with an embodiment of the present invention starts with the user retrieving a document with content from a server. There is a search for bearer service tags of the present invention if present, tags and content are parsed and the content sent using the bearer services identified by the tags.

The invention allows for the efficient use of network bandwidth by selecting services which will best transmit the content.

A BRIEF DESCRIPTION OF THE DRAWINGS

The above set forth and other features of the invention are made more apparent in the ensuing Detailed Description of the Invention when read in conjunction with the attached Drawings, wherein:

FIG. 2 is an illustration of a WAP browser.

FIG. 7 consists of FIGS. 7A and 7B.

DETAILED DESCRIPTION

The examples below describe the use of the invention in a Universal Mobile Telecommunication System (UMTS) utilizing a broadband code division multiple access (CDMA), (TDMA), method implemented with any WAP or the like, yet without restricting the invention thereto.

An example of a bearer service offered is SMS. Assignee of the present invention introduced a messaging concept called Smart Messaging at CeBit 1997. Smart messaging allows Internet information to be delivered to any GSM mobile station that supports short messages. Smart Messaging utilizes the Artus Messaging Platform that retrieves Internet information in HTML format and converts it to a short message via TTML. TTML, a subset of HTML, is Nokia's protocol for presenting information accessed from the Internet on GSM phones. Since Internet content retrieval is done in HTML content providers do not need to make changes to Web servers. Developers gain unified access to the entire global user community, by wireless telephony also.

Other mark-up languages such as XHTML and TML (Task Mark-up Language) are currently being used. Other specialty mark-up languages are also being developed. For example, Gene Expression Markup Language (GEML) from Rosetta Inpharmatics is an XML file specification for converting DNA microarray and gene expression data into a common format. International Business Machine is developing a WebSphere Voice Server which includes a voice XML (VXML) browser with a speech interface.

Those skilled in the art may be able to use the invention in these other languages. The spirit and scope of the invention is not intended to be limited to any one mark-up language.

Figure 1:
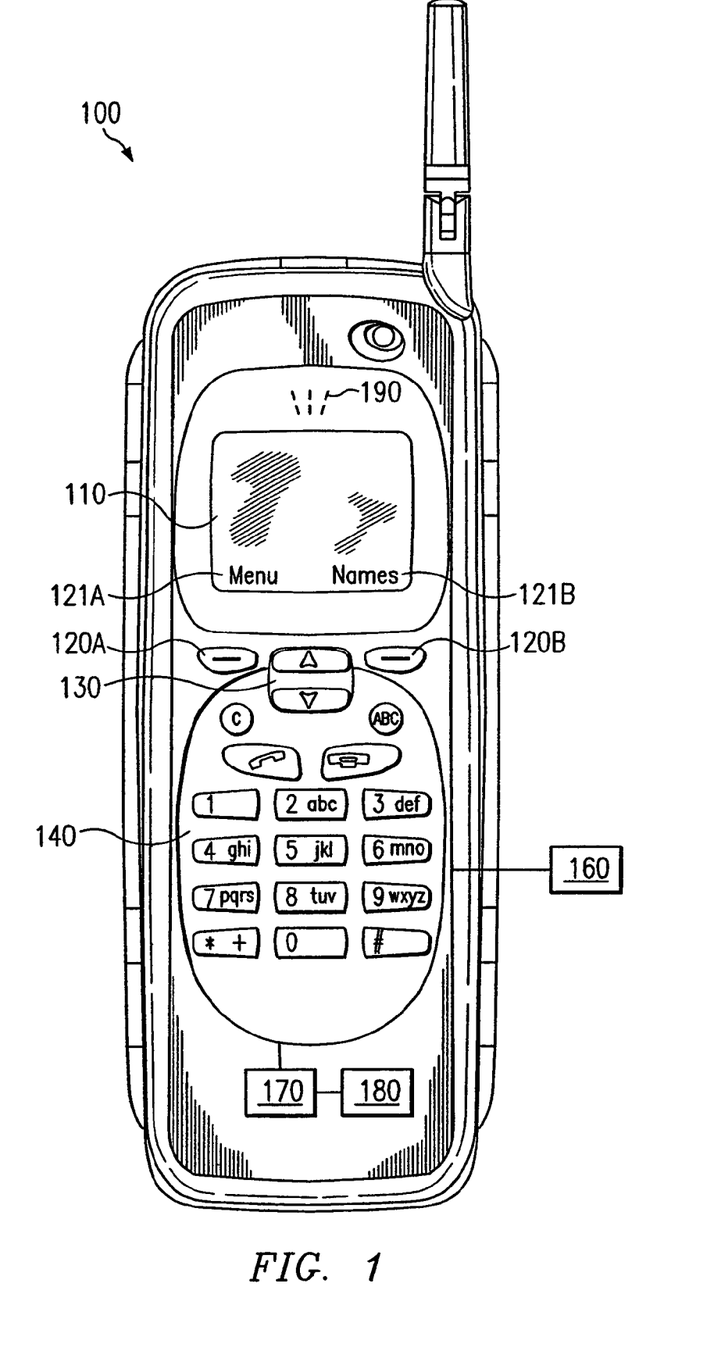
FIG. 1 is an illustration of mobile station for use in accordance with an embodiment of the present invention.

Referring now to the figures illustrating the present invention. FIG. 1 is an illustration of a typical mobile station that would be used in an embodiment of the present invention. This illustration is an exemplar only and the arrangement described is not critical to the practice of the invention. In this case, mobile station 100 is a wireless phone handset, also known as mobile station or personal trusted device. Mobile station 100 may comprise a wireless system which operates according to any various cellular standards, such as Global System for Mobile communication (GSM), Code Division Multiple Access (CDMA) or any of their progeny and the like.

Information on CDMA is provided by Telecommunications Standards (TIA). The books IS-95 CDMA and CDMA2000 by Vijay K. Garg; ISBN 0-13-087112-5; published by Prentice Hall (New Jersey) and WCDMA for UMTS Radio Access for Third Generation Mobile Communications edited by Harri Holma and Antti Toskala (both of Nokia, Finland); ISBN 0 471 72051 8; published by John Wiley and Sons, Ltd (England) provide a understanding of the material. Both books are incorporated herein by reference.

Mobile station 100 comprises a display 110 which displays data, menus and areas for softkey functions 121A and 121B that can be activated by pressing of softkeys 120A and 120B. Scroll keys 130 are also provided to scroll through menu items featured on display 110. Scroll keys 130 may also be a rolling cylinder, ball or the like which will allow for scrolling through items displayed. Keyboard 140 operates for the input of data. The keys of keyboard 140 may also be illuminated by various methods known to those skilled in the art to produce a visual reminder in response to an event. Entry of data may be facilitated by the use of predictive keyboard entry that is known by those skilled in the art. Data is stored in a memory 180. Memory 180 may include volatile Random Access Memory (RAM) including a cache area for the temporary storage of data. Mobile station 100 may also comprise non-volatile memory 160, which may be embedded or may be removable such as a removable Subscriber Identification Module (SIM). Non-volatile memory 160 may be EEPROM or flash memory and the like available from SanDisk (Sunnyvale, Calif.) or Lexar Media (Fremont, Calif.). Memories 160 and 180 may include logic that controls the operation of processor 170 to implement functions according to embodiments of the invention. The logic may be software or firmware code. Processor 170 generates appropriate commands and controls the other component blocks of mobile station 100. Processor 170 may also have embedded cache memory. Mobile station 100 also comprises a speaker 190.

Mobile station 100 may also be provided with an interface to allow the audio of the mobile station to be play over an existing audio system. Such an interface is provided by U.S. Pat. No. 6,163,711 entitled METHOD AND APPARATUS FOR INTERFACING A MOBILE PHONE WITH AN EXISTING AUDIO SYSTEM issued on Dec. 19, 2000 to Juntunen et al and assigned to assignee of the present application. Said patent is incorporated herein by reference. The patent describes the use of Radio Data Services (RDS) transmitted over the air interface used by mobile station 100. RDS allows for mobile station control of an external audio system such as a automobile radio.

Embodiments in accordance with the invention may be used in bearer services such as SMS, Circuit Switched Data (CSD), 3rd Generation Partnership Program (3GPP), and bearer independent solutions such as Wireless Application Protocol (WAP) and the like.

Details on WAP architecture and specifications are available from the WAP Forum and are herein incorporated by reference. The WAP specifications provides for a Wireless Applications Environment (WAE). WAE is provides a general application environment which builds on the World Wide Web (WWW) model of technologies.

In the WWW model, servers present content to clients in a standard format such as HTML or XML—also referred to as webpages or documents. The documents are browsed by user agents known as browsers embedded in the client. Resources on the WWW are named with internet standard Universal Resource Locators (URL)s. The browser communicates with the server using standard networking protocols, the most common of which is Hypertext Transport Protocol (HTTP).

WAE follows the WWW model. Content is in a standard format such as WML, which is similar to XML. In WAP, pages or documents of the WWW domain become cards or decks. Applications are provided which parse HTML formatted documents and translates them into HDML or WML format decks/cards. The content is transported using HTTP in the WWW domain of the network and HTTP-like protocol referred to as Wireless Session Protocol (WSP) in the wireless domain.

FIG. 2 is an illustration of a WAP client showing the protocol stack in layers. In the preferred embodiment of the present invention, Mobile station is configured as a WAP client. Like most network architecture, WAP is organized as a series of layers. Each of the layers of the architecture is accessible by the layers above as well as by other services and applications. These protocols are designed to operate over a variety of different bearer services such as SMS (Short Message Service), CSD (Circuit Switched Data), GPRS (General Packet Radio Service) etc.

WAP client 200 comprises user agent layer 230, URL & HTTP layer 240, protocol layer 250. WAP client 200 of FIG. 2 also comprises various Application Program Interfaces (API)s, such as Wireless Applications Environment (WAE API) 210. Platform APIs 215, and Wireless Datagram Protocol (WDP API) 220.

WDP adopts the User Datagram Protocol (UDP) defined in the WWW domain and the WDP API may support data bearer services of standards such as GSM, CDMA, GPRS, CDPD and the like.

User Agent Layer 230 comprises WML browser 231, WMLScript virtual machine 232 to program mobile station, and WMLScript libraries 233 that are a set of standard function. WML browser also referred to as a microbrowser communicates with a gateway using WSP. The gateway communicates with the server using HTTP.

Protocol Layer 250 comprises wireless protocol stack which in-turn comprises Wireless Session Protocol (WSP) 261, Wireless Transaction Protocol (WTP) 262, Wireless Transport Layer Security (WTLS) 263 for security control, Wireless Datagram Protocol (WDP) 264 may be coupled to bearer services and provides service to the upper layers on protocol stack 260.

URL & HTTP Layer 240 comprises URL Loader 241 HTTP Loader 242, and cache 243. This layer also comprises an adapter 245. In some art there is an entire layer called the Adaptation Layer. The Adaptation Layer is the layer of the WDP protocol that maps the WDP protocol functions directly onto a specific bearer. The Adaptation Layer is different for each bearer and deals with the specific capabilities and characteristics of that bearer service. Moreover, at the WAP Gateway or server, the Adaptation Layer is also called a Tunnel that terminates and passes the WDP packets on to a WAP Proxy/Server via a Tunneling protocol, which is the interface between the Gateway that supports the bearer service and the WAP Proxy/Server.

The Bearer Adapter is a component that connects the WAP Server to the wireless network. To support a number of different bearers, the gateway server will thus need to have a number of different bearer adapters.

Figure 3:
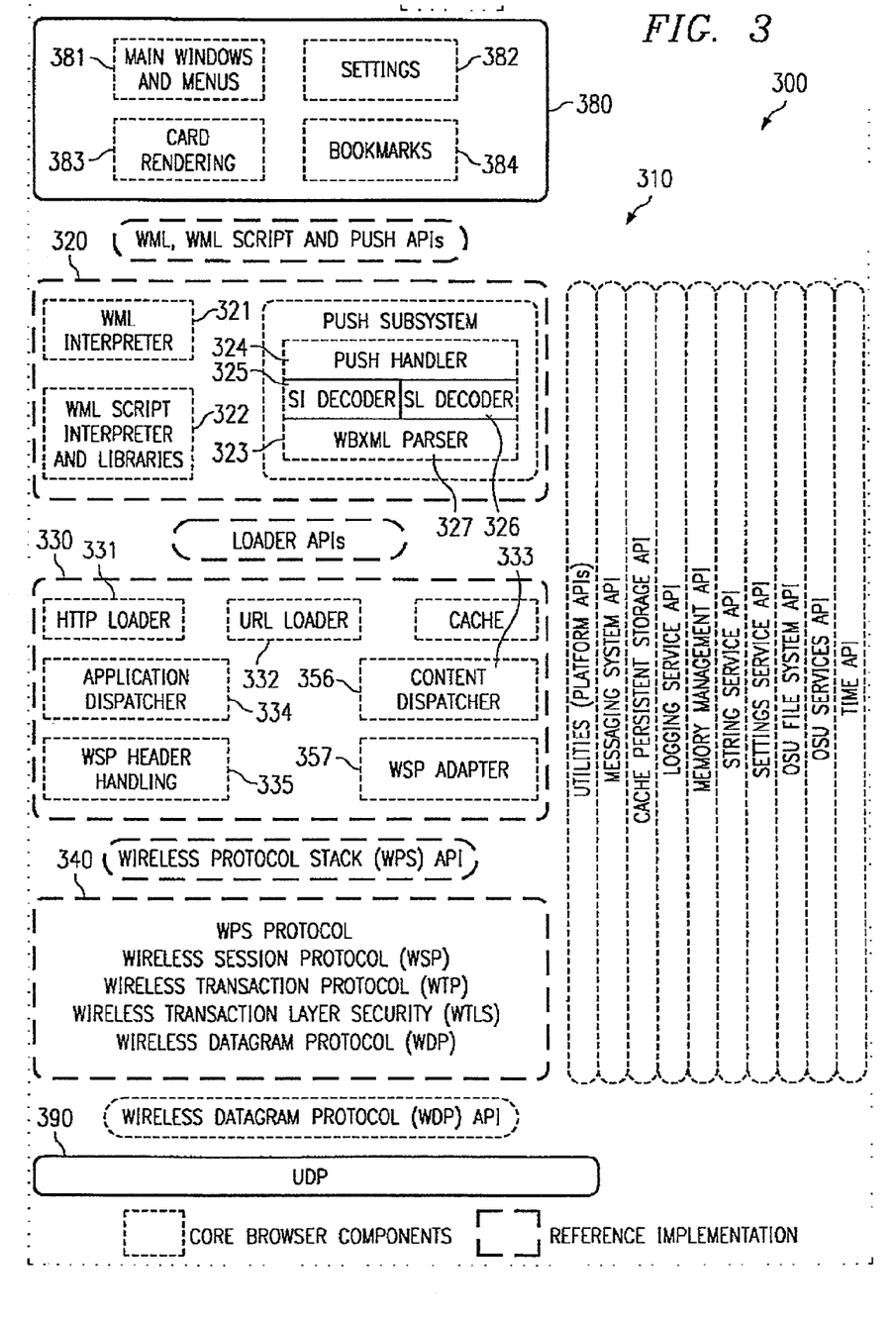
FIG. 3 is an additional illustration of a WAP browser.

FIG. 3 is another example of a WAP client on mobile station 100 of FIG. 1. Client 300 comprises, WML browser components 310, User Interface (UI) level 380, and Bearer level 390. WML browser interprets the WML contents (cards and decks) received from the WAP gateway and passes the content to UI using the APIs provided. The WML browser also maintains the browser state information.

UI level 380 further comprises main windows & menu component 381, settings 382, card rendering 383, and bookmark 384 components.

Bearer level 390 includes an implementation of a User Datagram Protocol (UDP) bearer. This bearer is capable of supporting Circuit Switched Data (CSD) networks among others.

User Agent (UA) Level comprises the core of the browser 310, namely, WML Interpreter 321, WMLScript Interpreter and standard libraries 322, and Push Subsystem 323. WML Interpreter supports the WML language specification including WBMP image files, an asynchronous image loader, and cookies. WMLScript Interpreter handles encoded WMLScript content and performs operations specified by said content. Libraries include support for browser and URL handling functions. UA Level interfaces with the UI Level using WML, WMLScript and Push APIs.

Push Subsystem 320 further comprises Push Handler 324, Service Indication (SI) Decoder 325, Service Loader (SL) Decoder 326, and a WBXML Parser 327. Push Subsystem utilizes the WBXML parser to dispatch Push messages to either SI Decoder 325 or SL Decoder 326. Once the message has been decoded, Push Handler 324 interacts with the mobile station's services, (i.e. messaging, alerts), and client's Loader Level 330 to complete the Push process. Although a Push process is described, the invention allow functions during a Pull process.

Loader Level 330 comprises HTTP Loader 331, URL Loader 332, Cache 333, Application Dispatcher 334, WSP Header Handling 335, Content Dispatcher 356, WSP Adapter 357. Loader Level 330 handles the loading of URLs using HTTP scheme. URL and header validations are performed at this level. Support for cookies and basic authentication are also provided. Cache logic and storage may also be supported at this layer. Loader Lever 330 also provides for content and application dispatching including Push dispatching. Loader Lever 330 interfaces with Wireless Protocol Stack (WSP) Level 340 via WSP handling API and UA Level via Loader APIs.

In prior art Push protocol schemes, a push initiator performs operations which query the push proxy gateway about specific client's (i.e. mobile station's), capabilities. As written above, these capabilities may be derived from capabilities negotiated during session establishment or from the user agent profile information. The invention also operates in a Pull environment in which an user may request content be transmitted per a specific bearer services.

Figure 4:
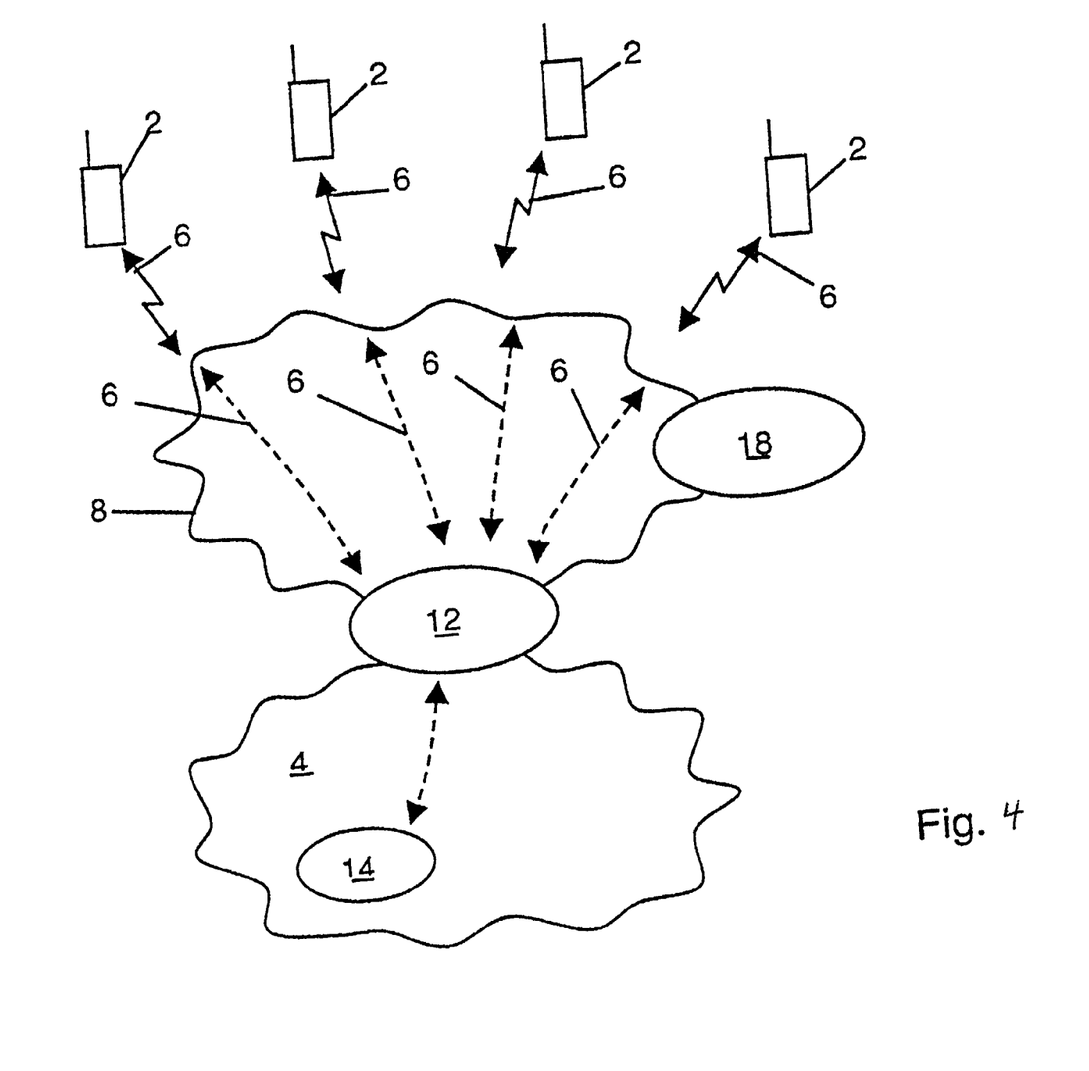
FIG. 4 is a illustration of a typical communication system in which an embodiment of the present invention operates.

FIG. 4 is a communication system in which an embodiment of the present invention operates. The communication system comprises a plurality of mobile stations 2 having access to the internet 4. The mobile stations transmit signals 6 which are received by and transmitted through a wireless network 8. The wireless network can be a number of different network systems such as GSM, CDMA IS-95, TDMA IS-136, WCDMA Wideband IS-95, IMT-2000, and UMTS, and may use different type of communication within one and the same system, for example SMS, GPRS or HSCSD communication within GSM. Accordingly, a number of different bearers may be used for transmitting signals 6. WAP requests 6 received by the network 8 are routed to a proxy or gateway server 12. Server 12 translates WAP requests into HTTP requests and thus allows the mobile stations 2 to request information from a web server 14 and thus browse the internet 4. Information obtained from the web server 14 is encoded by the proxy into a suitable format and then transmitted by the wireless network to mobile station 2 which requested it. The response comprises wireless mark-up language providing navigational support, data input, hyperlinks, text and image presentation, and forms. It is a browsing language similar to HMTL. Mobile station 2 processes and uses the information. If web server 14 provides content in WAP/WML format, the server 12 may retrieve such content directly from web server 14. However, if web server provides content in WWW format (such as HTML), a filter may be used to translate the content from WWW format to WAP/WML format.

In addition to web server 14, mobile stations 2 may communicate with a wireless telephony application (WTA) server 18. Also other types of origin servers are possible.

Figure 5:
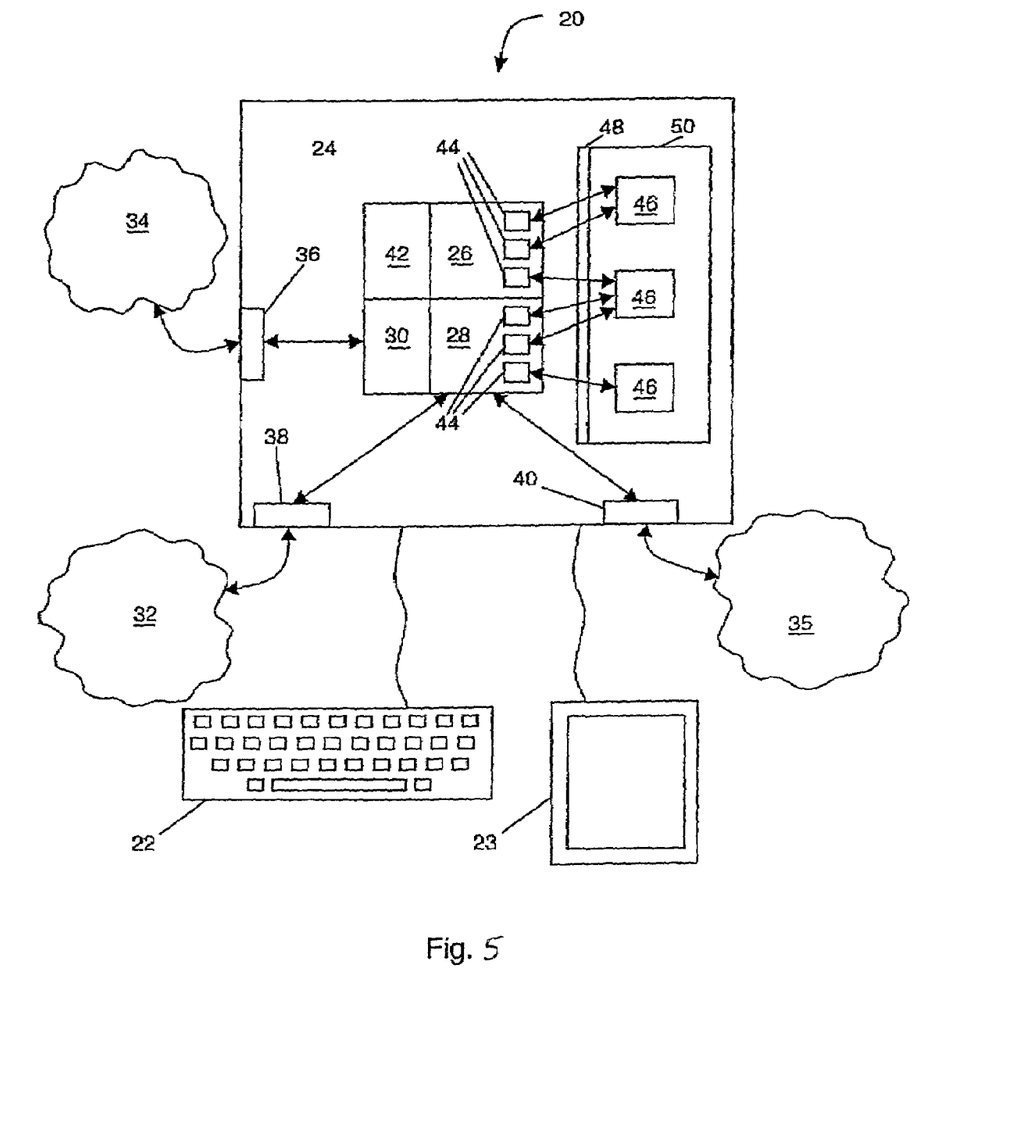
FIG. 5 is an illustration of a gateway server in which an embodiment of the present invention operates.

FIG. 5 shows a gateway server embodied in hardware such as computer 20. Computer 20 has dynamic memory, processing power and memory to store all of the programs needed to implement the gateway server such as the application program, the protocol stacks and the operating system. Computer 20 comprises a user interface such as a keyboard 22 and a display 23 and a server program 24. Server program 24 has an application program 26 for processing events of the underlying protocol, such as handling a request to retrieve WML from a server, and protocol stacks such as a WAP protocol stack 28 and a HTTP protocol stack 30. Application program 26 controls flow of data, including commands, requests and information, between the computer and various networks including a telephone network 32, the internet 34 and a data network and circuit switched data networks 35. Application program 26 may further run a program that may be seen on the display 23 and controlled with keypad 22 (and e.g. mouse). Computer 20 communicates with Internet 34 through HTTP protocol stack 30 and interface 36. Computer 20 communicates with telephone network 34 and data network 35 through interfaces 38 and 40. Server program 24 also comprises gateway 42 which converts between HTTP and WAP. SMS messaging may be provided via a data connection through appropriate hardware to operator's network.

Individuals threads 44 present in the application program 26 and the WAP protocol stack 28 use processors 46 in the computer 20 to carry out necessary processing tasks. Allocation of threads to processors is provided by threading services 48 present within the operating system 50 of computer 20.

As shown in FIGS. 2 and 3, the WAP stack is built on top of so called bearers (which provide datagram services). These bearers may be, for example, SMS or CSD. The bearers have their own protocol and are implemented through protocol stack implementations.

Figure 6:
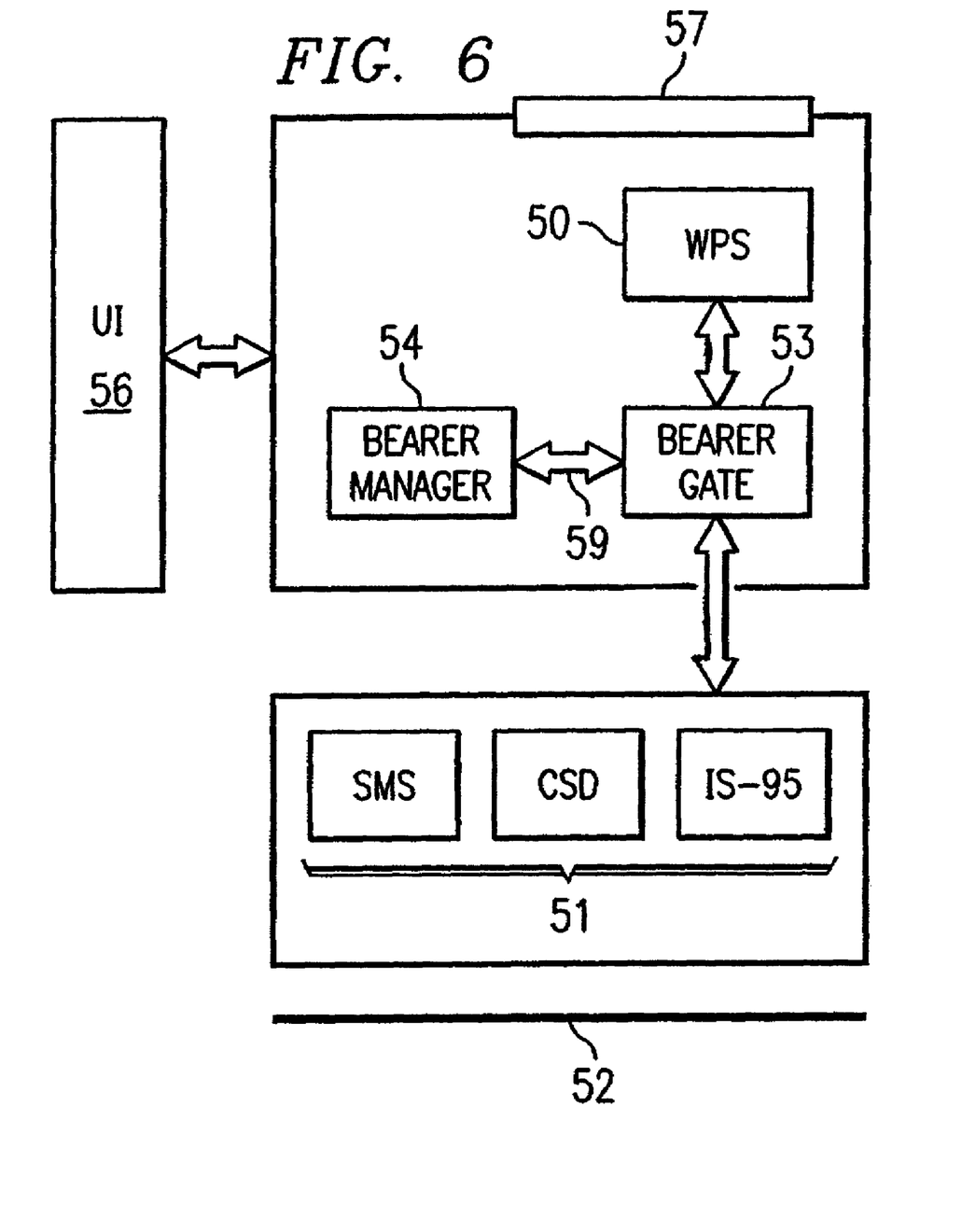
FIG. 6 shows a functional block diagram of a gateway server according to an embodiment of the present invention.

FIG. 6 shows a functional block diagram (embodied in software) of a gateway server according to the present invention, at least to the extent for understanding the invention. The gateway server includes a Wireless Protocol Stack (WPS) 50, such as the WAP stack shown in FIGS. 2 and 3. Below the WPS are the different bearer adapters 51 which access the different bearers through bearer drivers 52. Now there is provided between the WPS and the bearer adapters and the WPS. Bearer gate 53 further has a link 59 to a bearer manager 54, which controls and configures the bearer adapter operation with a user interface 56, such as keypad 22 and display 23 shown in FIG. 5. The connection to Internet, such as to a web server is via interface 57.

The gateway server uses the bearer gate 53 and bearer adapter 51 in two ways:

1) To transmit data to a particular wireless network,
2) To control and monitor the bearer operation.

In accordance with the present invention, special mark-up language tags may be used to provide for bearer selection during Push or Pull operations. In this way different data/information may be sent over different bearer channels depending upon the bandwidth and other parameters of the data. For example, some data may be sent over a slow SMS channel, whereas other important data may be sent over a General Packet Radio Service (GPRS) channel or a Circuit Switched Channel using the BEARER type tag:

<BEARER
 <GSM="NT, 14400"/GSM>
 other content . . .
</BEARER>
<BEARER
 <TDMA="SMS"/TDMA>
 other content . . .
</BEARER>

This allows for a page to be parsed and certain data requiring high speeds to be sent over one channel and other data not requiring such high speed to be sent over a slower channel. Optimization of the capacity of the radio network may be achieved when correct-type capacity is used for each data-type. The elements of the tags may be the parameters of the bearer services.

A special signaling protocol was provided by publication WO 99/01991 entitled DETERMINING BEARER SERVICES IN A RADIO ACCESS NETWORK U.S. patent application Ser. No. 09/155,201 filed on Mar. 24, 1997, assigned to entity of the assignee of the present invention and said application incorporated herein by reference.

This protocol is termed radio bearer service protocol (RBC). The bearer service is represented by means of various bearer service parameters, examples of which are given below. The bearer service parameters comprise four main classes: 1) traffic parameters, 2) quality of service (QoS) parameters, 3) information parameters, and 4) content parameters.

Traffic Parameters:

Peak Bit Rate (PBR), units: bit/s, is the maximum instantaneous bit rate in connection with maximum burst size. Indicates the constant bit rate in the absence of other traffic parameters.

Sustainable bit rate (SBR), units: bit/s, is the upper bound on the conforming average bit rate of the connection.

Maximum burst size (MBS), units: bits, gives an estimation of the maximum burst size that may be transmitted at peak bit rate.

Frame size specification: number of entries, minimum size, intermediate size9s0, maximum size. For unsynchronized services, a frame may have any size between minimum and maximum. For synchronized services, requested intermediate sizes may be defined and the list defines the discrete frame sizes used, corresponding to discrete bit rates.

Minimum bit rate MBR, units: bit/s is the minimum bit rate required for URAN ABR traffic.

Quality of Service (QoS) Parameters

Bit error rate BER is bit error rate of the connection.

Delay.

Frame loss ratio, (FLR), percent ratio, is the ratio of lost frames to all frames sent.

Priority.

Information Parameters

Direction, uplink/downlink. Gives the direction of a simplex bearer. For two-way bearers, "bi-directional" is specified.

Configuration, point-to-point/point-to-multipoint. Gives the configuration of the connection in terms of point-to-point or point-to-multipoint service.

Type, control/unsynchronized/synchronized. Control: the traffic consists of signaling. Unsynchronized traffic: the traffic is not synchronized with the radio interface timing. Synchronized traffic: Radio interface timing information is required.

Content Parameters

Coding: Indicates the speech codec used.

Figure 7A:
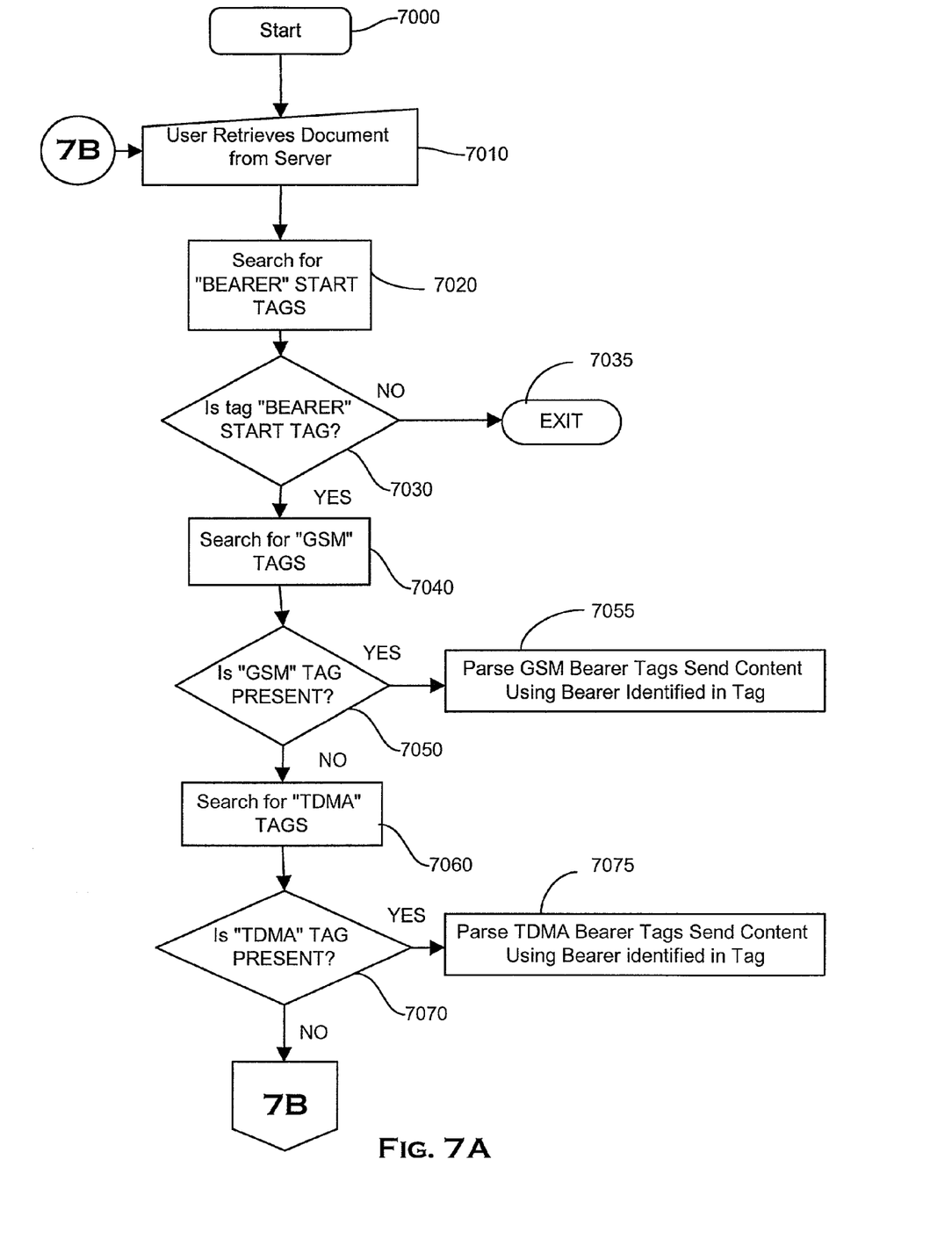
FIG. 7 is a flowchart showing a method according to an embodiment of the present invention.
Figure 7B:
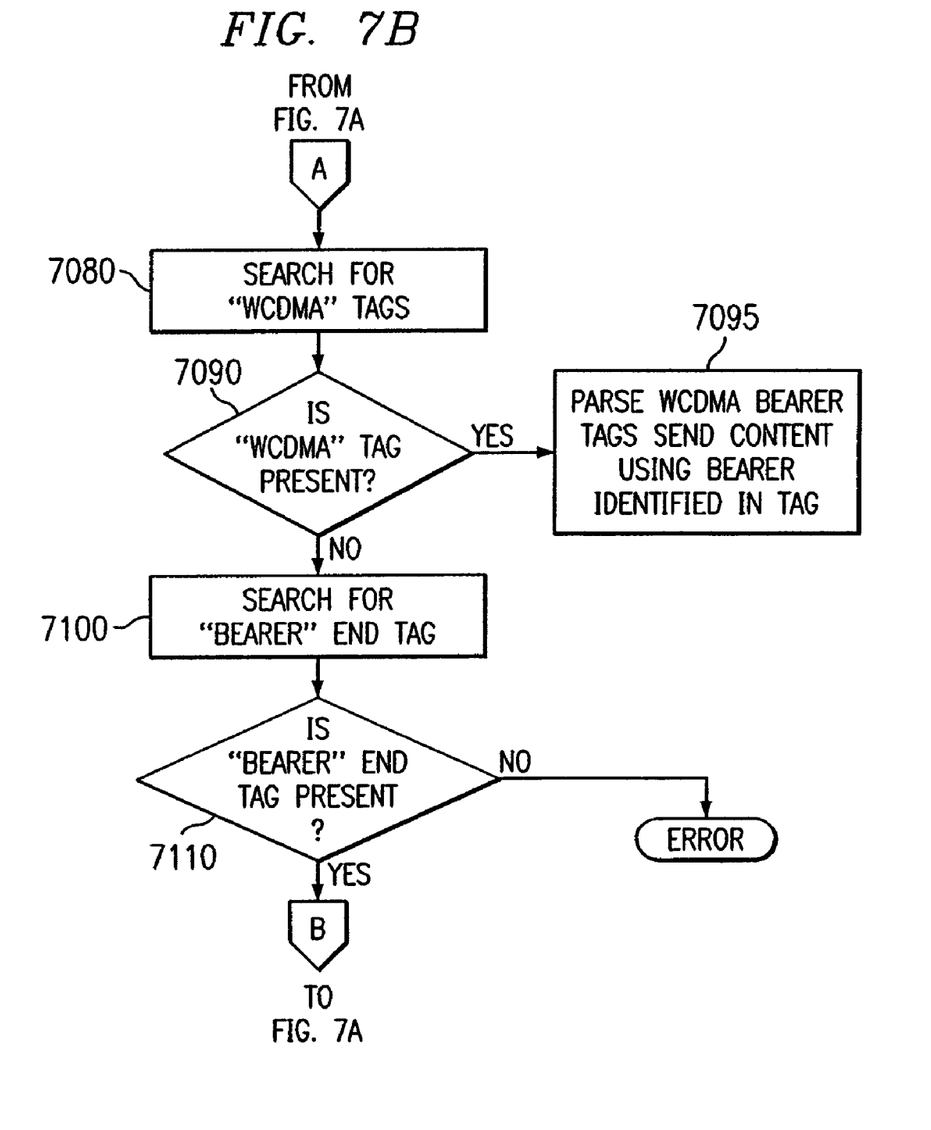

FIG. 7 consisting of FIGS. 7A and 7B, is flowchart showing a method in accordance with an embodiment of the present invention. The process illustrated in the flowchart is to be used as an example. Modifications and variations are deemed to be within the scope of the invention. The method Starts (7000) with the user retrieving a document from a server step 7010. There is a search for "BEARER START TAGS (7020). If no BEARER START tags are found, the process exits 7035. If BEARER START tags are present 7050, the GSM bear tags are parsed and the content is sent using the bearer services identified by the tags (step 7055).

If no GSM tags are found, then a search for TDMA tags is conducted 7060. The TDMA bearer tags are parsed and the content is sent using the services identified by the tag 7075, if TDMA tags are present 7070.

The method continues on FIG. 7B. A search is conducted for WCDMA tags 7080 and if present 7090, the WCDMA bearer tags are parsed and the content sent using the bearer services identified by the tags 7095.

When a BEARER end tag is found at steps 7100 and 7110, the process starts again by the user retrieving a document from a server at step 7010.

As will be recognized by those skilled in the art, the innovative concepts described in the present application can be modified and varied over a tremendous range of applications, and accordingly the scope of patented subject matter is not limited by any of the specific exemplary teachings given. Applicant herein defines plurality to mean one or more.

What is claimed is:

1. An information control device to provide for the selection of bearer services for sending data over a network comprising:

a server for retrieving a tagged document comprising: (i) a plurality of bearer services tags having type indications that indicate different preferred bearer services for different portions of the tagged document and a plurality of service parameters associated with the preferred bearer services; and (ii) data to be sent by the preferred bearer services indicated by said bearer services tags, wherein the server thereafter transmits the different portions of the data by different the bearer services in accordance with the plurality of bearer services tags.

2. The information control device of claim 1, wherein the at least one of the plurality of bearer services is GSM.

3. The information control device of claim 1, wherein the at least one of the plurality of bearer services is TDMA.

4. The information control device of claim 1, wherein the at least one of the plurality of bearer services is WCDMA.

5. A method for selecting a preferred bearer service to transmit data over a network comprising the steps of:

retrieving a tagged document with content from a server;

searching for bearer services tags associated with the tagged document which identify a bearer service for which the content is best suited;

identifying a plurality of bearer services tags associated with the tagged document which identify different preferred bearer services for different portions of the document;

and sending the content using the bearer services identified by said tags wherein sending the content comprises sending the content of different portions of the document by different bearer services in accordance with the plurality bearer services tags.

6. The method of claim 5, wherein the at least one of the plurality of bearer services is GSM.

7. The method of claim 5, wherein the at least one of the plurality of bearer services is TDMA.

8. The method of claim 5, wherein the at least one of the plurality of bearer services is WCDMA.

* * * * *